US011472236B2

(12) United States Patent
Kretschmann et al.

(10) Patent No.: US 11,472,236 B2
(45) Date of Patent: Oct. 18, 2022

(54) METHOD, CONTROL DEVICE, AND SYSTEM FOR DETERMINING A PROFILE DEPTH OF A PROFILE OF A TIRE

(71) Applicant: CONTINENTAL AUTOMOTIVE GMBH, Hannover (DE)

(72) Inventors: Matthias Kretschmann, Munich (DE); Shichao You, Munich (DE)

(73) Assignee: Continental Automotive GmbH, Hannover (DE)

(*) Notice: Subject to any disclaimer, the term of this patent is extended or adjusted under 35 U.S.C. 154(b) by 337 days.

(21) Appl. No.: 16/767,209

(22) PCT Filed: Nov. 27, 2018

(86) PCT No.: PCT/EP2018/082705
§ 371 (c)(1),
(2) Date: May 27, 2020

(87) PCT Pub. No.: WO2019/102036
PCT Pub. Date: May 31, 2019

(65) Prior Publication Data
US 2021/0008933 A1    Jan. 14, 2021

(30) Foreign Application Priority Data

Nov. 27, 2017 (DE) .......................... 102017221142.3

(51) Int. Cl.
*B60C 11/24* (2006.01)
*B60C 23/04* (2006.01)
*B60C 23/06* (2006.01)

(52) U.S. Cl.
CPC ........ *B60C 11/246* (2013.01); *B60C 23/0408* (2013.01); *B60C 23/061* (2013.01)

(58) Field of Classification Search
CPC . B60C 11/246; B60C 23/0408; B60C 23/061; B60C 23/04; B60W 2050/0031;
(Continued)

(56) References Cited

U.S. PATENT DOCUMENTS 5,789,668 A * 8/1998 Coe .................... G01B 21/20
73/146
9,340,212 B2    5/2016 Tao et al.
(Continued)

FOREIGN PATENT DOCUMENTS

DE          10058099 A1    5/2002
DE      102012217901 B3    5/2014
DE      102015104468 A1   10/2015

*Primary Examiner* — Eric Blount
(74) *Attorney, Agent, or Firm* — Laurence A. Greenberg; Werner H. Stemer; Ralph E. Locher (57) ABSTRACT

A method for determining a tread depth of a tread of a tire during operation of a vehicle having the tire, a control device for a vehicle for determining a tread depth of a tread of a tire of the vehicle, and a system for a vehicle having such a control device and at least one electronic wheel unit, are provided. Provision is made to determine the tread depth based on a determined instantaneous dynamic wheel radius of a wheel, having the tire, of the vehicle and a determined instantaneous dynamic inside radius of the tire. In addition, at least one further first operating parameter of the tire, selected from the group including an instantaneous roadway gradient, an instantaneous vehicle drive mode and an instantaneous tire material expansion, is determined and taken into consideration.

17 Claims, 5 Drawing Sheets

(58) Field of Classification Search
CPC ..... B60W 2050/0037; B60W 2520/10; B60W 2520/105; B60W 2520/14; B60W 2520/28; B60W 2520/30; B60W 2530/20; B60W 2540/18; B60W 2552/15; B60W 40/12; G01M 17/02
USPC ........................................................ 701/29.4
See application file for complete search history.

(56) References Cited

U.S. PATENT DOCUMENTS

| | | |
|---|---|---|
| 9,669,664 B2 | 6/2017 | Kretschmann |
| 11,124,026 B2 * | 9/2021 | Kretschmann ........ B60C 11/246 |
| 11,230,146 B2 * | 1/2022 | Kuerzl ................. B60C 11/246 |
| 2019/0270347 A1 * | 9/2019 | Stewart ................... B60C 11/24 |
| 2020/0062042 A1 * | 2/2020 | Pryce ................... G01B 11/026 |

* cited by examiner

METHOD, CONTROL DEVICE, AND SYSTEM FOR DETERMINING A PROFILE DEPTH OF A PROFILE OF A TIRE

BACKGROUND OF THE INVENTION

Field of the Invention

The present invention relates to a method for determining a tread depth of a tread of a tire during operation of a vehicle having the tire, to a control device for a vehicle for determining a tread depth of a tread of a tire of the vehicle, and to a system for a vehicle, having such a control device and at least one electronic wheel unit.

DE 10 2012 217 901 B3 discloses a method for determining a tread depth of a tread of a tire, which method comprises the following steps:

determining an instantaneous rotational speed of a wheel, having the tire, of the vehicle based on data determined by at least one first sensor, determining an instantaneous speed of the vehicle based on data determined by at least one second sensor which is different from the at least one first sensor, determining an instantaneous dynamic wheel radius of the wheel having the tire based on the determined instantaneous rotational speed and the determined instantaneous speed, determining at least one first operating parameter of the tire, selected from the group consisting of an instantaneous tire temperature, an instantaneous tire pressure and an instantaneous tire load, determining an instantaneous dynamic inside radius of the wheel based on the at least one determined first operating parameter, wherein the inside radius of the wheel is the distance between the wheel center and the tire-side start of the tread, determining a tread depth of the tread of the tire based on the determined instantaneous dynamic wheel radius and the determined instantaneous dynamic inside radius.

SUMMARY OF THE INVENTION

One object of the present invention is to improve the determination of the tread depth as explained above with regard to the accuracy of the determination result.

A first aspect of the invention relates to a method for determining a tread depth of a tread of a tire during operation of a vehicle having the tire, wherein the method comprises the following steps:

determining an instantaneous rotational speed of a wheel, having the tire, of the vehicle based on data determined by at least one first sensor, determining an instantaneous speed of the vehicle based on data determined by at least one second sensor which is different from the at least one first sensor, determining an instantaneous dynamic wheel radius of the wheel having the tire based on the determined instantaneous rotational speed and the determined instantaneous speed of the vehicle, determining at least one first operating parameter of the tire, selected from the group consisting of an instantaneous tire temperature, an instantaneous tire pressure and an instantaneous tire load, determining an instantaneous dynamic inside radius of the wheel based on the at least one determined first operating parameter, wherein the inside radius of the wheel is the distance between a wheel center and a tire-side start of the tread, determining a tread depth of the tread of the tire based on the determined instantaneous dynamic wheel radius and the determined instantaneous dynamic inside radius.

At least one further first operating parameter of the tire, selected from the group consisting of an instantaneous roadway gradient, an instantaneous vehicle drive mode and an instantaneous tire material expansion is further determined in the method. The instantaneous dynamic inside radius is further determined based on the at least one determined further first operating parameter. Therefore, according to said aspect of the invention, the instantaneous dynamic inside radius is determined based on the at least one determined first operating parameter and the at least one determined further first operating parameter.

In this case, the at least one further first operating parameter of the tire can also be referred to as "at least one further operating parameter", that is to say the expression "at least one further first operating parameter" can be replaced by "at least one further first operating parameter" here and below.

It has advantageously been found that also taking into consideration one, preferably at least two, further preferably all, of the abovementioned further first operating parameters ("further operating parameters") within the context of the method for determining a tread depth allows the accuracy of the determination result to be improved in a simple manner, as will be explained in more detail below.

The instantaneous roadway gradient can be defined, in particular, as an angle of the roadway with respect to the horizontal plane, for example the angle of inclination (positive or negative) as viewed in the direction of travel, or as another measure representing such an angle (for example tangent of the angle or the like). As an alternative or in addition to a measure of the angle of inclination as viewed in the direction of travel, the roadway gradient can also represent, for example, an angle of inclination as viewed transversely to the direction of travel (for example a transverse direction of the vehicle).

The instantaneous vehicle drive mode is relevant in vehicles in which a drive torque generated in a drivetrain by a drive device of the vehicle can be distributed between the wheels of the vehicle in different ways (drive modes). One example is a vehicle in which the drive torque acts either only on the wheels of one axle (for example front wheels or rear wheels) or else on all of the axles or all of the wheels (for example front wheels and rear wheels) depending on the mode. Furthermore, in said aspect of the invention, the vehicle drive mode can also be taken into consideration, for example, in a vehicle which, in accordance with so-called "torque vectoring", distributes a total drive torque between a plurality of wheels in a variable manner (and, for example, provides "torque vectoring" data which can be used for the invention).

The instantaneous tire material expansion is a parameter which represents the instantaneous extent of the tire radius-increasing expansion of the tire material. This is based on the consideration that the tire material irreversibly expands due to operation-related loadings (primarily tire pressure and centrifugal forces) over the service life of a tire, this resulting in a corresponding increase in the size of the tire radii (inside and outside). Within the scope of the invention, the instantaneous tire material expansion can be defined or quantified in particular, for example, as an additional contribution to the dynamic inside radius of the tire that results overall made instantaneously due to the effect of the tire material expansion.

The instantaneous roadway gradient has a significant influence on the dynamic radii of the tire, in particular for a roadway gradient as viewed in the direction of travel, that is to say when the vehicle is traveling downhill or uphill. For example, a vehicle traveling uphill requires more drive torque in the drivetrain (equivalent to more drive force to be transmitted to the roadway), due to a component of the force of gravity acting counter to the direction of travel, than a vehicle traveling at the same speed on a flat roadway. The increased drive torque on the driven axle or the driven wheels causes greater slip at the wheels in question (for example the front wheels in the case of front-wheel drive or the rear wheels in the case of rear-wheel drive). In this case, it is possible that the dynamic wheel radius may be underestimated and accordingly also that the tread depth may be underestimated for each wheel in question.

In one embodiment in which the instantaneous roadway gradient is determined as a further (first) operating parameter, results of the instantaneously carried out determination operations are rejected as invalid and/or results of steps of the method based thereon are rejected as invalid in the event of the determined roadway gradient exceeding a predetermined roadway gradient threshold value.

For example, identical absolute roadway gradient threshold values can be used for downhill travel and uphill travel for angles of inclination as viewed in the direction of travel.

As an alternative or in addition, an angle of inclination as viewed in the transverse direction of the vehicle can be taken into consideration with the instantaneous roadway gradient, wherein identical absolute roadway gradient threshold values can be provided for an inclination to the left and an inclination to the right in this case too.

The accuracy and, respectively, reliability of the tread depth determination is advantageously improved by way of filtering out the results determined under unfavorable conditions in this way.

In one embodiment in which the instantaneous roadway gradient is determined as a further (first) operating parameter, a correction which is linearly dependent on the determined instantaneous roadway gradient is made when determining the instantaneous dynamic inside radius.

Such a linear correction is simple to carry out (for example with a low level of computational expenditure) and is often already sufficient as such in practice, that is to say additional non-linear corrections can be dispensed with.

An additive correction is preferably performed when determining the instantaneous dynamic inside radius, that is to say an additional contribution due to a roadway gradient is added to the dynamic inside radius determined without taking into consideration the roadway gradient. In the case of a linear correction, an additional contribution can be represented in the following form:

$$r2_{dyn,SL} = C_{SL} \cdot SL$$

where:
$r2_{dyn,SL}$ denotes the additional contribution to the dynamic inside radius,
$C_{SL}$ denotes the coefficient of the linear correction,
SL denotes the roadway gradient.

The coefficient $C_{SL}$ can be predetermined, for example, separately for each vehicle axle and used in the correction for the wheels in question.

The correction is primarily of importance in the case of an axle driven with a positive or negative torque because, here, as mentioned, a roadway gradient SL which is different from zero changes the slip conditions.

If all of the wheels are braked when traveling downhill, the correction should accordingly be performed for all of the wheels.

In one development, the coefficient $C_{SL}$ for the wheel in question is predetermined depending on which of a plurality of axles the wheel is located on and/or depending on whether the wheel is instantaneously accelerating, braking or rotating.

In one embodiment, the instantaneous roadway gradient is determined based on a vehicle acceleration measured by means of an acceleration sensor of the vehicle and on a vehicle longitudinal acceleration determined by evaluating at least one rotational speed of a wheel of the vehicle.

The vehicle acceleration measured by means of the acceleration sensor preferably represents the vectorial vehicle acceleration measured in all three spatial directions. Therefore, roadway gradients both as viewed in the direction of travel and also as viewed in the transverse direction of the vehicle can be determined below.

The functional principle of this embodiment is that, due to ever-present gravity, the results of the two vehicle acceleration measurements differ from one another since gravity influences only the result of the acceleration measured by means of the acceleration sensor, wherein the roadway gradient can then be determined, for example calculated, from the resulting vectorial difference between the two accelerations.

In one embodiment in which the instantaneous vehicle drive mode is determined as a further (first) operating parameter, a correction which is linearly dependent on a drive torque determined depending on the determined instantaneous vehicle drive mode is made when determining the instantaneous dynamic inside radius.

The instantaneous vehicle drive mode can be determined here, for example, from vehicle information data present in any case, for example for other purposes (for example for an electronic stability program, a "torque vectoring" system etc.).

The instantaneous vehicle drive mode can specify, in particular for example for each wheel, the positive or negative torque instantaneously provided thereby.

When, for example, a changeover is made in the vehicle from one drive mode to another drive mode, for example from pure rear-wheel drive or front-wheel drive to all-wheel drive, this leads to a new distribution of the drive torques to the wheels and therefore to new slip conditions at the individual wheels. Accordingly, the determination of the dynamic inside radius and accordingly of the tread depth could be corrupted when the vehicle drive mode is changed without taking into account said change in mode.

According to this embodiment, a correction is made, said correction at least comprising a linear component which, as in the case for the correction due to the roadway gradient already explained, is formed as an additive additional contribution based on a vehicle drive mode or based on increased/reduced torque at the wheel in question in the following form:

$$r2_{dyn,DT} = C_{Tq} \cdot Tq$$

where:
$r2_{dyn,DT}$ denotes the additional contribution to the dynamic inside radius,
$C_{Tq}$ denotes the coefficient of the linear correction,
Tq denotes the individual drive torque.

The coefficients $C_{T_q}$ for each wheel can be, for example, predefined, or else can be learnt during driving, for example by evaluating the determined dynamic radii in each case immediately before and immediately after a change in the vehicle drive mode.

In one embodiment in which the instantaneous vehicle drive mode is determined as a further (first) operating parameter, a correction implemented, for example, by means of a lookup table is made depending on the determined instantaneous vehicle drive mode and the determined instantaneous speed of the vehicle when determining the instantaneous dynamic inside radius.

This takes account of the fact that a meaningful measurement of the abovementioned coefficients ($C_{T_q}$) is dependent to a relatively great extent on the speed of the vehicle. The correction which can therefore be realized more accurately taking into account the vehicle speed can be expressed as follows:

$$r2_{dyn,DT} - C_{DT}(DT, v)$$

Here, DT denotes the instantaneous vehicle drive mode and v denotes the instantaneous speed of the vehicle.

In one embodiment, the instantaneous tire material expansion is determined based on a tire age of the tire as a further (first) operating parameter, and a correction is made depending on the determined instantaneous tire material expansion when determining the instantaneous dynamic inside radius.

The tire material expansion is based on an aging process of the tire and has a significant influence in respect of determining the tread depth. If the inside radius of the tire is increased in size, for example, by 1 mm owing to this effect, this means an overestimation of the tread depth of approximately the same order of magnitude without taking this effect into consideration. During normal tire operation, the tire material expansion means a continuous increase in the determined dynamic inside radius, in particular in an early first stage of the service life of a new tire.

In one development, the difference between an instantaneous time and a time of production of the tire is used as the tire age within the context of the abovementioned embodiment. The production time of a tire can be entered, for example by workshop personnel after replacement of a tire, into a controller of the vehicle in order to be available for said method. As an alternative or in addition, the production time can be stored as a constituent part of so-called tire information data (for short: tire data) in an electronic wheel unit arranged in the tire in question, so that this information can be transmitted by the electronic wheel unit to a control device of the vehicle.

In another development, the sum of the previous time periods in which the tire in question was actually in operation, also referred to as accumulated tire operating period below, is used as the tire age. The required summing can be performed in a simple manner, for example by an electronic wheel unit arranged in the tire and/or by a central control device of the vehicle, wherein operation of the tire can be considered to be, for example, rotation of said tire or, for example, rotation of said tire at a predetermined minimum rotational speed. In one development, said time periods of tire operation are added in a weighted manner, for example with a weighting depending on a loading parameter determined during the respective time periods, in order to acquire the tire age. The loading parameter can be selected, in particular, for example depending on an extent of the vehicle speeds and/or an extent of the vehicle accelerations within the time period in question.

In another development, a tire distance, defined as the distance covered by the tire in question in an operation-related manner, which is also referred to as mileage of the tire below, is used as the tire age. In one development, individual partial distances covered are added (accumulated) in a weighted manner here, for example with a weighting depending on a loading parameter determined while traveling the respective partial distances, in order to acquire the tire age. The loading parameter can be selected, in particular, for example depending on an extent of the vehicle speeds and/or an extent of the vehicle accelerations within the partial distance in question.

In a more specific development, a plurality of the abovementioned three parameters (time period since production, accumulated tire operating period, mileage) of combined tire age parameters is used as the tire age. Such a combination can be realized, for example from a mathematical point of view, as a linear combination in which the three parameters are each summed in a weighted manner with a weighting coefficient.

In one development, the instantaneous tire material expansion is determined based on a predetermined model function for mapping the instantaneous tire age of the tire onto the instantaneous tire material expansion, wherein the model function is a concave function.

Here, the model function can be, for example, predetermined depending on tire information data of the tire which is saved, for example, by workshop personnel.

In one development, the tread depth is determined based on the instantaneous tire age of the tire in a first phase immediately after installation of a new tire, wherein an influence of the speed of the vehicle on the instantaneous dynamic wheel radius is learnt in a second phase beginning, for example, following said first phase or even before the end of the first phase, and wherein the tread depth is first determined based on the determined instantaneous dynamic wheel radius and the determined instantaneous dynamic inside radius in a third phase following said second phase.

In this development too, the tire age can be used in a manner defined in a different way for the purpose of determining the tread depth in the first phase as already explained further above when determining the tire material expansion. However, when determining the tread depth based on the instantaneous tire age in the first phase, the use of the time period since production of the tire is generally less advantageous than using the accumulated tire operating period and/or the mileage.

When determining the tread depth, provision can be made, for example, in the first phase for the tread depth to linearly decrease depending on the mileage.

Termination of the first phase can be provided, for example, when a prespecified termination criterion is satisfied, for example when the tire age exceeds a predetermined tire age threshold value, for example mileage greater than 1000 km. The threshold value can be predetermined, for example, in a tire type-dependent manner, for example determined on the basis of the abovementioned tire information data.

The process, provided in the second phase, of learning the influence of the speed of the vehicle on the instantaneous dynamic wheel radius can take place, for example, in such a way that a plurality of measurement data points, which each contain values of the vehicle speed and the dynamic wheel radius determined for the identical time, can be recorded over a predetermined, relatively small tire age interval (for example at most 10% of the abovementioned tire age threshold value or for example a fixedly prespecified tire distance in the range of from 5 km to 100 km, for example 10 km or 20 km), and that the influence of the vehicle speed on the dynamic wheel radius is quantified on the basis of a statistical analysis of the measurement data points acquired in this way.

Termination of the second phase can be provided, for example, when a corresponding termination criterion is satisfied. There are various options for specifically defining this criterion. One option is that of providing a predetermined tire age interval for the second phase. Another option is, for example, that of the second phase being continued or the abovementioned quantification of the influence of the speed being repeated until the situation of this influence now changing slightly, for example below a prespecified change threshold, occurs on the basis of the results of the quantifications. This situation can be interpreted such that the effect of the tire material expansion is largely concluded and now only relatively small increases in the dynamic inside radius can be expected during subsequent operation of the tire.

In one embodiment, the abovementioned model function is determined in the second phase, for example when the second phase is terminated, by way of the variables determined in the second phase and possibly even in the first phase being evaluated.

For advantageously determining the tread depth without interruption, provision is made according to one embodiment for the abovementioned first phase to first be terminated when the third phase begins. In this respect, for example, the abovementioned criterion for terminating the second phase and beginning the third phase can simultaneously be used for terminating the first phase.

In respect of the step provided in the invention of determining the tread depth of the tire based on the determined instantaneous dynamic wheel radius and the determined instantaneous dynamic inside radius, for example in the abovementioned third phase, it is clear that the method of determining the tread depth simply as the difference between the dynamic wheel radius and the dynamic inside radius functions well at least when the tire in question largely retains its round shape in spite of the wheel or tire load acting on it, that is to say the so-called tire footprint is relatively small, this tending to be the case, for example, given a high tire pressure and/or low tire load. However, it should be borne in mind that, in practice, the difference between a geometric wheel radius and a geometric inside radius, that is to say the radii which are completely independent of tire operation on a vehicle and which are measured as such on a tire, for example, removed from the vehicle, is considered to be the tread depth of a tire. However, the dynamic radii (dynamic wheel radius and dynamic inside radius) during operation of the tire deviate therefrom to a greater or lesser extent, such that the determination of the tread depth as a difference between the dynamic radii, and not the geometric radii, can typically constitute only an approximation.

According to one development of the invention, provision is therefore made, for the purpose of further increasing the determination accuracy, for the tread depth to be determined taking into consideration a correction variable determined beforehand for the type of tire, wherein the correction variable characterizes the relationship between a change in the tread depth on the one hand and a change resulting therefrom in the difference between the dynamic wheel radius and the dynamic inside radius on the other hand.

It has been found that, by taking into account such a correction variable which is dependent at least on the type of tire, it is advantageously possible to determine the tread depth with improved accuracy.

To determine this correction variable beforehand, a specimen of the tire in question can, for example, be operated on a test bench under controlled operating conditions and in particular controlled variation of operating parameters, including the tread depth, and in the process can be measured in order to determine the correction variable as a result of this measurement.

Within the context of the development, the correction variable constitutes a means by way of which a correlation between the abovementioned dynamic radii and geometric radii is established or beneficially used.

In one particularly simple embodiment, a correction constant characteristic of the type of tire is used as the correction variable, which correction constant represents the relationship between the change in the tread depth on the one hand and the change resulting therefrom in the difference between the dynamic wheel radius and the dynamic inside radius on the other hand.

In particular, a correction constant which is greater than 1 and, for example, is at least 1.5, in particular at least 2, depending on the type of tire, can advantageously be used here. On the other hand, it is generally expedient if the correction constant is at most 8, in particular at most 5.

If such a correction constant is used as the correction variable, then, when determining the tread depth taking into consideration the correction constant, any change in the difference between the dynamic wheel radius and the dynamic inside radius can be mapped mathematically onto a corresponding change in the tread depth.

The mapping, that is to say the mathematical function, in this case constitutes a linear function in that a change in the difference between the dynamic wheel radius and the dynamic inside radius multiplied by the correction constant gives the associated change in the tread depth.

It is pointed out at this juncture that, very generally, determining a change in the tread depth is equivalent to determining the tread depth insofar as the instantaneous tread depth is given by each subsequent change in tread depth due to the knowledge of an initial tread depth, specifically as the initial tread depth minus the change in tread depth.

The initial tread depth, for example the tread depth of a new tire or for example the tread depth initially measured when a used tire is fitted, can be stored, for example, in a memory device of a system used to carry out the method, for example in a control device of the vehicle or in an electronic wheel unit on the tire in question. The tread depth can then be continuously updated in a manner according to the invention.

In one generalized development suitable for further increasing the determination accuracy, a correction function, characteristic of the type of tire, for mapping a difference between the dynamic wheel radius and the dynamic inside radius onto a change in the tread depth is used as the correction variable.

Therefore, mapping that is even better matched to the type of tire in question of a difference between the dynamic wheel radius and the dynamic inside radius onto a change in the tread depth may also advantageously be carried out, for example in a manner deviating from the explained consideration of a correction constant or the use of a linear function.

In one embodiment, provision is made for the correction function to additionally depend on at least one functional parameter, selected from the group consisting of the speed of the vehicle, the tire temperature, the tire pressure and the tire load.

As an alternative or in addition, provision can be made, for example, for the function value to additionally depend on the dynamic wheel radius and/or the dynamic inside radius and therefore not necessarily only on the difference between these two variables.

To realize the latter embodiments, it is expedient, in the abovementioned measurement of a specimen of a specific type of tire and/or a measurement of a plurality of specimens of the same type but with a different tread depth on a test bench, to vary one or more parameters in a controlled manner, especially those that are provided as functional parameters of the correction function. Based on the result of such a measurement, it is then possible to define the required correction function, for example byway of a mathematical fit, wherein the correction function can be defined, in particular, by one or more characteristic curves or a lookup table.

Accordingly, provision is made in one exemplary embodiment for the process of taking into consideration the correction function when determining the tread depth to be performed by means of at least one characteristic curve stored in a memory device.

The at least one characteristic curve can characterize, in particular, for example a relationship between a change in the tread depth or the tread depth itself and other variables determined in the context of the method, in particular for example the difference between the dynamic wheel radius and the dynamic inside radius. Provision is preferably made of a multiplicity of characteristic curves or a characteristic curve diagram which can be used when determining the change in the tread depth or the tread depth itself in the manner of a lookup table, in order to read the change in tread depth or the tread depth based on the values of the previously determined variables in question.

In one embodiment, provision is made for at least one second operating parameter to be additionally determined, which second operating parameter is selected from the group consisting of an instantaneous acceleration of the vehicle, an instantaneous yaw rate of the vehicle, an instantaneous steering angle, an instantaneous torque of a drive motor of the vehicle and an operating state of a braking device of the vehicle, wherein the tread depth is additionally determined depending on the at least one determined second operating parameter.

By taking into consideration at least one such second operating parameter, it is possible, for example, to further improve the accuracy of the tread depth determination. As an alternative, the determination of at least one such second operating parameter may also however be used to identify an operating situation, in which the vehicle is excessively accelerated for example, that is unfavorable for the tread depth determination and, in such situations, to defer the tread depth determination until a more favorable operating situation is reached again or to identify or to reject the values of the tread depth determined during the unfavorable situation, for example, as inaccurate and/or invalid.

In one embodiment, the at least one first sensor is designed as a rotational speed sensor.

The rotational speed of the wheel can be determined easily and reliably using a rotational speed sensor. By way of example, rotational speed sensors which can be used for this purpose are advantageously generally provided in modern motor vehicles in any case, for example for the purpose of operating safety and comfort systems such as, for example, an anti-lock braking system (ABS) or an electronic stability program (ESP).

In one embodiment, the at least one second sensor is selected from the group consisting of a satellite-assisted position determination sensor, a radar sensor, a lidar sensor, an ultrasound sensor and an optical camera.

At least one such sensor is often also present in any case for example in modern vehicles, as a result of which this can advantageously be jointly used in the context of the invention.

In one embodiment, provision is made for the instantaneous dynamic inside radius to additionally be determined based on the determined instantaneous speed of the vehicle and/or additionally based on the type of tire.

Said parameters can likewise have an influence on the inside radius of the wheel, as a result of which, by taking these into account as well, the accuracy of the inside radius determination and therefore also of the tread depth determination can advantageously be improved.

In one embodiment, the instantaneous dynamic inside radius is determined by means of at least one characteristic curve stored in a memory device.

The at least one characteristic curve can characterize, in particular, a relationship between the dynamic inside radius and the at least one first operating parameter and/or the at least one further (first) operating parameter of the wheel. Provision is preferably made of a multiplicity of characteristic curves or a characteristic curve diagram which can be used in the manner of a lookup table when determining the inside radius.

A second aspect of the invention relates to a control device for a vehicle for determining a tread depth of a tread of a tire of the vehicle, having:
- a reception device, designed to receive an instantaneous rotational speed of a wheel, having the tire, of the vehicle, an instantaneous speed of the vehicle and at least one first operating parameter of the tire, selected from the group consisting of an instantaneous tire temperature, an instantaneous tire pressure and an instantaneous tire load,
- a first determination device, designed to determine an instantaneous dynamic wheel radius of the wheel having the tire based on the received instantaneous rotational speed and the received instantaneous speed of the vehicle,
- a second determination device, designed to determine an instantaneous dynamic inside radius of the wheel based on the at least one received first operating parameter, wherein the inside radius of the wheel is the distance between a wheel center and a tire-side start of the tread, and
- a third determination device, designed to determine a tread depth of the tread of the tire based on the determined instantaneous dynamic wheel radius and the determined instantaneous dynamic inside radius.

The reception device is further designed to receive at least one further (first) operating parameter of the tire, selected from the group consisting of an instantaneous roadway gradient, an instantaneous vehicle drive mode and an instantaneous tire material expansion. The reception device is therefore designed to receive an instantaneous rotational speed of a wheel, having the tire, of the vehicle, an instantaneous speed of the vehicle, at least one first operating parameter of the tire, selected from the group consisting of an instantaneous tire temperature, an instantaneous tire pressure and an instantaneous tire load, and at least one further (first) operating parameter of the tire, selected from the group consisting of an instantaneous roadway gradient, an instantaneous vehicle drive mode and an instantaneous tire material expansion.

The second determination device is additionally designed to determine the instantaneous dynamic inside radius further based on the at least one determined further (first) operating parameter. The second determination device is therefore designed to determine the instantaneous dynamic inside radius based on the at least one determined first operating parameter and the at least one determined further (first) operating parameter.

The control device can be designed, for example, as a standalone device for the purpose of determining the tread depth on at least one, preferably a plurality of, or all of the tires of the vehicle. As an alternative, the control device can constitute a constituent part or a partial functionality of a control device of the vehicle that additionally also serves for other purposes, for example of a central controller of the vehicle, a controller of an anti-lock braking system or of a vehicle dynamics control system.

All of the embodiments and special configurations described here in the context of the method in accordance with the first aspect of the invention can accordingly also be provided, individually or in any desired combination, as embodiments or special configurations of the control device according to the second aspect of the invention and of the system described below according to a further aspect of the invention.

A further aspect of the invention therefore proposes a system for a vehicle for determining a tread depth of a tread of a tire of the vehicle, having a control device of the type described here and at least one electronic wheel unit, wherein the at least one electronic wheel unit can be arranged in the tire and has at least one sensor selected from the group consisting of a temperature sensor, a pressure sensor, an acceleration sensor (including a shock sensor) and a deformation sensor.

The invention is described in more detail below on the basis of exemplary embodiments with reference to the accompanying drawings.

DETAILED DESCRIPTION OF THE INVENTION

Figure 1:
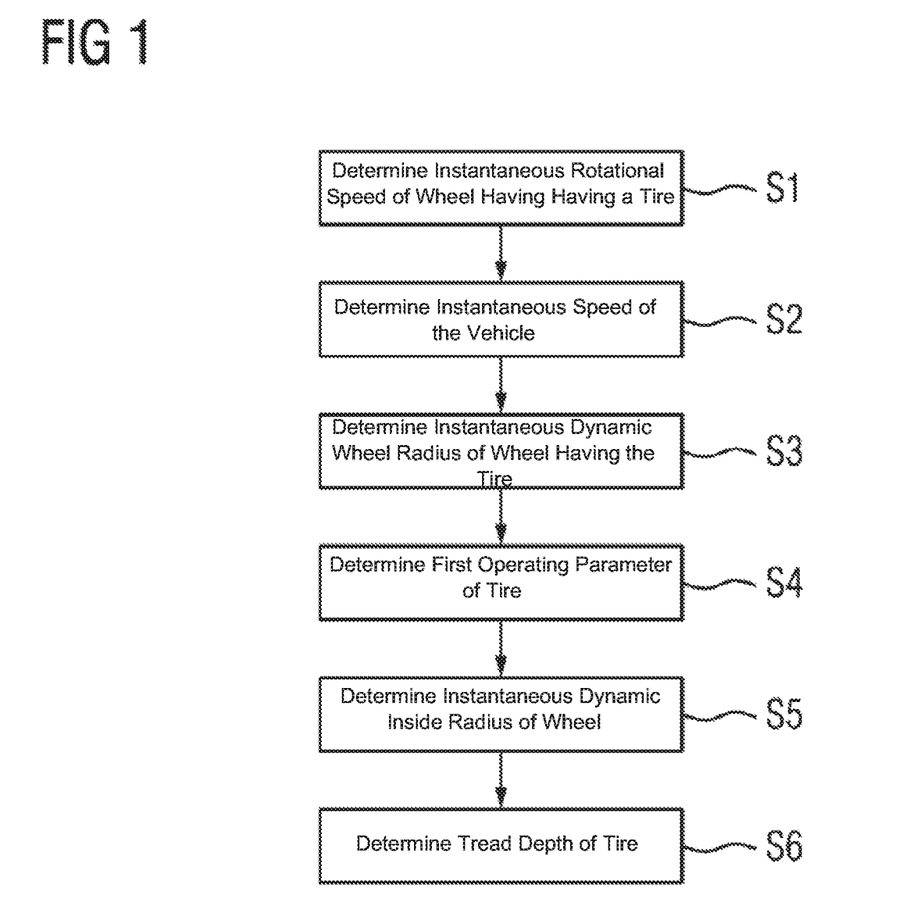
FIG. 1 shows a flowchart for a method for determining a tread depth of a tread of a tire.

FIG. 1 shows a flowchart of a method for determining a tread depth of a tread of a tire during operation of a vehicle having the tire according to one exemplary embodiment.

In a step S1, an instantaneous rotational speed of a wheel, having the tire, of the vehicle is determined based on data determined by at least one first sensor. By way of example, an instantaneous angular speed $\omega$ of the wheel is determined. To this end, the at least one first sensor is preferably designed as a rotational speed sensor.

In a step S2, an instantaneous speed v of the vehicle (vehicle longitudinal speed) is determined based on data determined by at least one second sensor which is different from the at least one first sensor. Determining the instantaneous speed v typically involves determining a value of a distance covered by the vehicle in a specific time interval based on the data determined by the at least one second sensor. To this end, the at least one second sensor is designed, for example, as a satellite-assisted position determination sensor (for example as a GPS device). Furthermore, the at least one second sensor can be designed, for example, as a radar sensor, lidar sensor, ultrasound sensor or optical camera in order to thereby determine, for example, a distance of the vehicle from objects identified as being stationary at different times and to determine the distance covered by the vehicle therefrom.

In a step S3, an instantaneous dynamic wheel radius $r1_{dyn}$ of the wheel having the tire is determined based on the determined instantaneous rotational speed, that is to say the angular speed $\omega$ in the exemplary embodiment shown, and the determined instantaneous vehicle speed v. In the exemplary embodiment shown, this is performed by means of the relationship $v = r1_{dyn} \cdot \omega$, where, as already mentioned, v denotes the instantaneous speed of the vehicle, $r1_{dyn}$ denotes the instantaneous dynamic wheel radius of the wheel and $\omega$ denotes the instantaneous angular speed of the wheel.

In a step S4, at least one first operating parameter of the tire selected from the group consisting of an instantaneous tire temperature T, an instantaneous tire pressure p and an instantaneous tire load RL is determined. At least two, in particular all three of said parameters, are preferably determined in this case. In particular, said parameters can be determined, for example, by means of an electronic wheel unit arranged in the tire in question, as is explained in yet more detail in connection with the further figures.

In addition, three further first operating parameters of the tire (which can also be called "further operating parameters" for short), specifically an instantaneous roadway gradient SL, an instantaneous vehicle drive mode DT and an instantaneous tire material expansion BE, are further determined in step S4 in the exemplary embodiment shown.

In the illustrated example, the instantaneous roadway gradient SL is defined as the instantaneous angle of inclination as viewed in the direction of travel, that is to say the angle of the roadway with respect to the horizontal direction.

In the illustrated example, the instantaneous vehicle drive mode DT is an item of operating state information which indicates how a drive torque generated by a drive device of the vehicle is instantaneously distributed between the wheels of the vehicle.

In the illustrated example, the instantaneous tire material expansion BE is defined as the instantaneous extent of an additional contribution $r2_{dyn,BE}$ to the dynamic inside radius $r2_{dyn}$ of the tire that results overall.

In a step S5, the instantaneous dynamic inside radius $r2_{dyn}$ of the wheel is determined based on the at least one determined first operating parameter (T and/or p and/or RL) and the determined further (first) operating parameters (SL and DT and BE), wherein the inside radius of the wheel is the distance between the wheel center and the tire-side start of the tread.

Here, the instantaneous dynamic inside radius $r2_{dyn}$ can additionally be determined based on the determined instantaneous speed v of the vehicle and/or additionally based on the type of tire since these parameters also have an influence on the inside radius of the tire that results in an operating situation. The type of tire can be stored, for example, in a memory device of an electronic wheel unit in question, for example together with an initial tread depth.

The type of tire or data stored in respect of this can specify, in particular, for example whether said tire is a summer tire, a winter tire or an all-year tire and/or specify whether the tire material is relatively hard or relatively soft (in particular also in quantitative terms) and/or specify a type of tread.

The type of the tread or data stored in respect of this can specify, in particular, for example the tread pattern defined by elevations and depressions and/or physical properties of the tread that result therefrom.

The instantaneous dynamic inside radius $r2_{dyn}$ is preferably determined by means of at least one characteristic curve stored in a memory device.

The dynamic inside radius $r2_{dyn}$ of the wheel typically increases as the tire temperature T increases and as the tire pressure p increases, whereas an increasing tire load RL typically leads to a reduction in the dynamic inside radius $r2_{dyn}$. As the speed v of the vehicle increases, the dynamic inside radius $r2_{dyn}$ typically increases, wherein the increase in the inside radius $r2_{dyn}$ typically transitions into a saturation when a specific speed range is reached.

Said dependencies can advantageously be determined beforehand, for example, by a corresponding measurement of a specimen of a tire of the type of tire in question on a test bench in order to determine one or preferably a plurality of characteristic curves or a characteristic curve diagram for the type of tire in question. When carrying out the method according to the invention during operation of the vehicle, it is possible to then use such characteristic curves stored in a memory device when determining the dynamic inside radius $r2_{dyn}$.

The determination of the instantaneous dynamic inside radius carried out in the step S4 is additionally based on the further (first) operating parameters SL, DT and BE. In the illustrated example, the instantaneous roadway gradient SL is firstly taken into consideration in such a way that, when an absolute value of SL exceeds a predetermined roadway gradient threshold value, the recording situation is judged to be highly unfavorable and all of the instantaneously determined variables for determining the tread depth are rejected as invalid. On the other hand, if the absolute value of SL does not exceed the roadway gradient threshold value, an additional contribution $r2_{dyn,SL}$ is calculated taking into consideration SL and at least the speed v of the vehicle and is added to a value of $r2_{dyn}$ calculated beforehand without taking into consideration SL (correction of $r2_{dyn}$ based on the roadway gradient SL).

In the illustrated example, the instantaneous vehicle drive mode DT can be determined from so-called "torque vectoring" data of a vehicle electronics system and therefore a total drive torque (positive or negative) of the vehicle and also the distribution of said total drive torque between the individual wheels of the vehicle can be known. In the illustrated example, DT is then taken into consideration in a similar way to that for SL, specifically by calculating an additional contribution $r2_{dyn,DT}$ for the further correction of $r2_{dyn}$.

The additional contribution based on DT is generally different from wheel to wheel, depending on DT, and can be calculated in good approximation (just like the additional contribution based on SL) as a linear correction term, that is to say proportionally to a drive torque or an additional drive torque of the wheel in question.

In the illustrated example, the instantaneous tire material expansion BE is determined based on a predetermined model function which maps a mileage, in the illustrated example an accumulated previous distance traveled, of the tire in question onto the instantaneous tire material expansion BE, and in which said model function is a concave function, similarly to a function which maps a value onto the square root of said value.

This specifically selected model function or functional parameters which determine it can be stored, for example, in a memory device of the electronic wheel unit in question and therefore can be used after being called up by a control device.

In a departure from this exemplary embodiment, provision can also be made, for example, to determine and/or to update (to improve) the model function by way of an influence of the speed v of the vehicle on the instantaneous dynamic wheel radius $r1_{dyn}$ being learnt at least periodically during operation of the vehicle in order to draw a conclusion about which point on the graph the model function is instantaneously located at on the basis of a quantitative change in said influence considered over relatively large tire age intervals (for example a mileage of at least 1000 km), and in order to define or to update the model function to be used in future on the basis of the data collected in such a learning phase. After the learning phase is complete, the tread depth can then be determined in a following further phase (in the last step of the method according to the invention) based on $r1_{dyn}$ and $r2_{dyn}$, wherein the model function is accordingly taken into consideration when determining $r2_{dyn}$. If no other model function which can be used for this is defined, the tread depth can be determined in another way, for example calculated as decreasing proportionally to the mileage.

In a step S6, the tread depth td of the tread of the tire is determined based on the determined instantaneous dynamic wheel radius $r1_{dyn}$ and the determined instantaneous dynamic inside radius $r2_{dyn}$.

According to the teaching of DE 10 2012 217 901 B3 already mentioned at the outset, this tread depth determination (step S6) would take place based on both of said variables on the basis of the following relationship:

$$td = r1_{dyn} - r2_{dyn}$$

Even though this relationship appears to yield good results for many types of tire and many operating situations with regard to tire and/or vehicle, it has been found that the tread depth determination based at least on dynamic wheel radius $r1_{dyn}$ and dynamic inside radius $r2_{dyn}$ can be further improved by a measure according to which the tread depth td is determined taking into consideration a correction variable determined beforehand for the type of tire, wherein the correction variable characterizes the relationship between a change in the tread depth td, on the one hand, and a change resulting therefrom in the difference between the dynamic wheel radius $r1_{dyn}$ and the dynamic inside radius $r2_{dyn}$, on the other hand.

Therefore, while it is a prerequisite according to said document for the tread depth determination for all types of tire that a change in the difference between $r1_{dyn}$ and $r2_{dyn}$ is always equivalent to a change of exactly the same magnitude in td ($\Delta td=\Delta(r1_{dyn}-r2_{dyn})$), use is made in the tread depth determination according to this exemplary embodiment of the finding that this relationship does constitute a good approximation, but this does not always yield satisfactory results in particular for specific types of tire and/or in specific operating situations of the tire and/or of the vehicle.

In the exemplary embodiment, a more or less large systematic error in the tread depth determination is advantageously partially compensated for by way of taking into consideration, as mentioned, the correction variable in order to accordingly improve the determination result.

Before discussing further possible refinements of the method according to the invention in detail, a vehicle 1, which is equipped with a system for carrying out the method according to the invention, is first described with reference to FIGS. 2 and 3.

Figure 2:
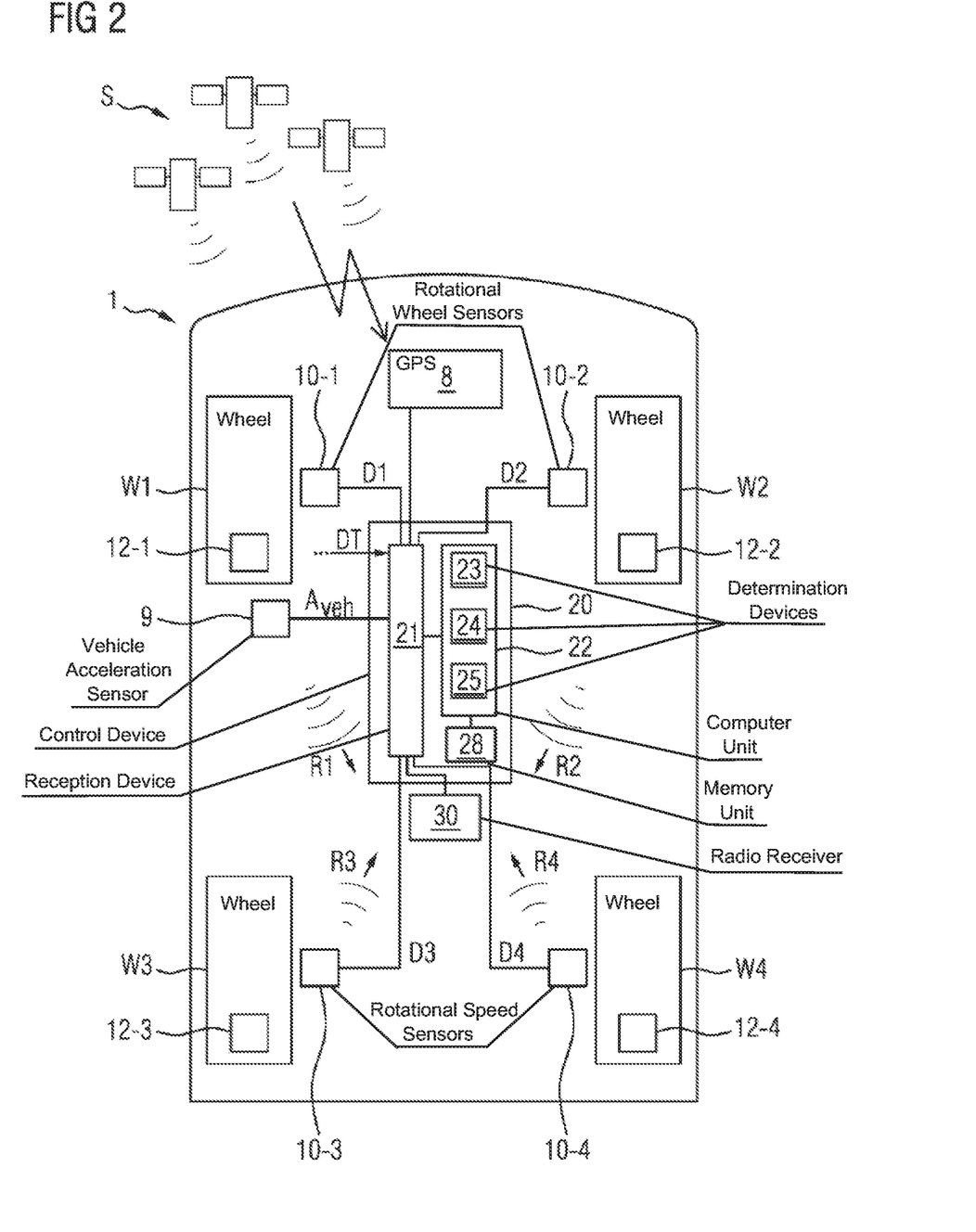
FIG. 2 shows a schematic plan view of a vehicle having a system by means of which the method of FIG. 1 can be carried out.

FIG. 2 shows a vehicle 1 which has four vehicle wheels W1-W4 in the illustrated example. The vehicle 1 is, for example, a passenger car.

The reference numerals of components that are present multiple times in one embodiment but have the same effect (for example the wheels W1-W4) are numbered consecutively and each have a hyphen and a consecutive number added. Reference is also made below to individual such components or to all such components by the reference numeral which does not have a hyphen and a consecutive number added.

Figure 3:
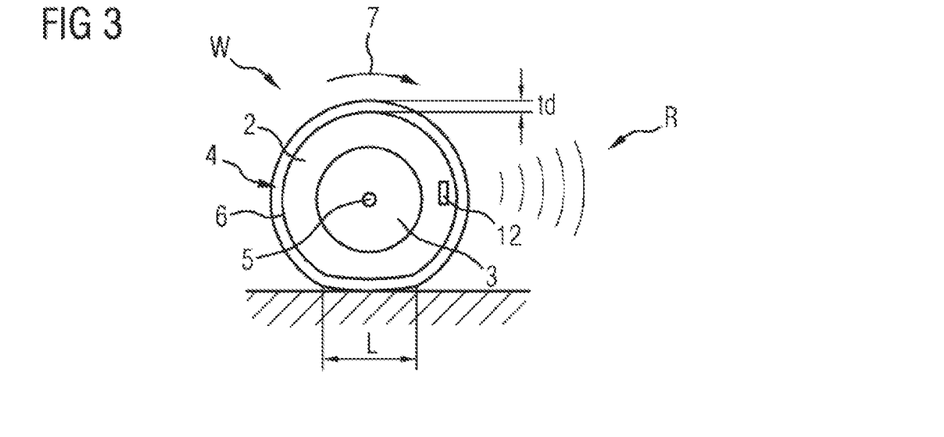
FIG. 3 shows a schematic side view of a wheel of the vehicle of FIG. 2.

FIG. 3 shows, by way of example, a wheel W of the vehicle 1 (FIG. 2), which wheel may be any of the wheels W1-W4 shown in FIG. 2.

The wheel W is formed by an air-filled tire 2 and a rim 3, wherein the tire 2 has a tread 4, schematically illustrated in FIG. 3, having a tread depth td.

During operation of the vehicle 1 having the tire 2, the wheel W rotates about its wheel center 5. The arrow 7 symbolizes this wheel rotation, in which the radially outer end (facing away from the tire) of the tread 4 rolls on the driving surface. The radially inner end of the tread 4, that is to say the tire-side start of the tread 4, is denoted by the reference numeral 6.

A tire load RL exerted by the vehicle 1 on the wheel W and therefore the tire 2 causes a certain deformation of the tire 2 in which, as illustrated in FIG. 3, a more or less large tire footprint is formed between the tire 2 and the driving surface, the length of which footprint is denoted L in FIG. 3.

The wheel W is furthermore equipped with an electronic wheel unit 12 arranged thereon (cf. electronic wheel units 12-1 to 12-4 in FIG. 2), by means of which wheel operating parameters of the wheel W can be recorded and corresponding wheel operating data can be transmitted to a control device 20 of the vehicle 1 (FIG. 2) in the form of a periodically transmitted radio signal R (cf. radio signals R1-R4 in FIG. 2).

In the illustrated example according to FIG. 2, a tire pressure monitoring system (TPMS) of the vehicle 1 is formed with the aid of the electronic wheel units 12-1 to 12-4. Accordingly, the electronic wheel units 12-1 to 12-4 each record at least the tire pressure p of the vehicle wheel in question from amongst the vehicle wheels W1-W4, and the electronic wheel units 12-1 to 12-4 transmit wheel operating data containing at least one item of information about the tire pressure p to the control device 20 of the vehicle 1.

The electronic wheel units 12-1 to 12-4 are of identical design and are arranged on an inner side of a tire tread surface of the respective tire 2 in the illustrated example.

Figure 6:
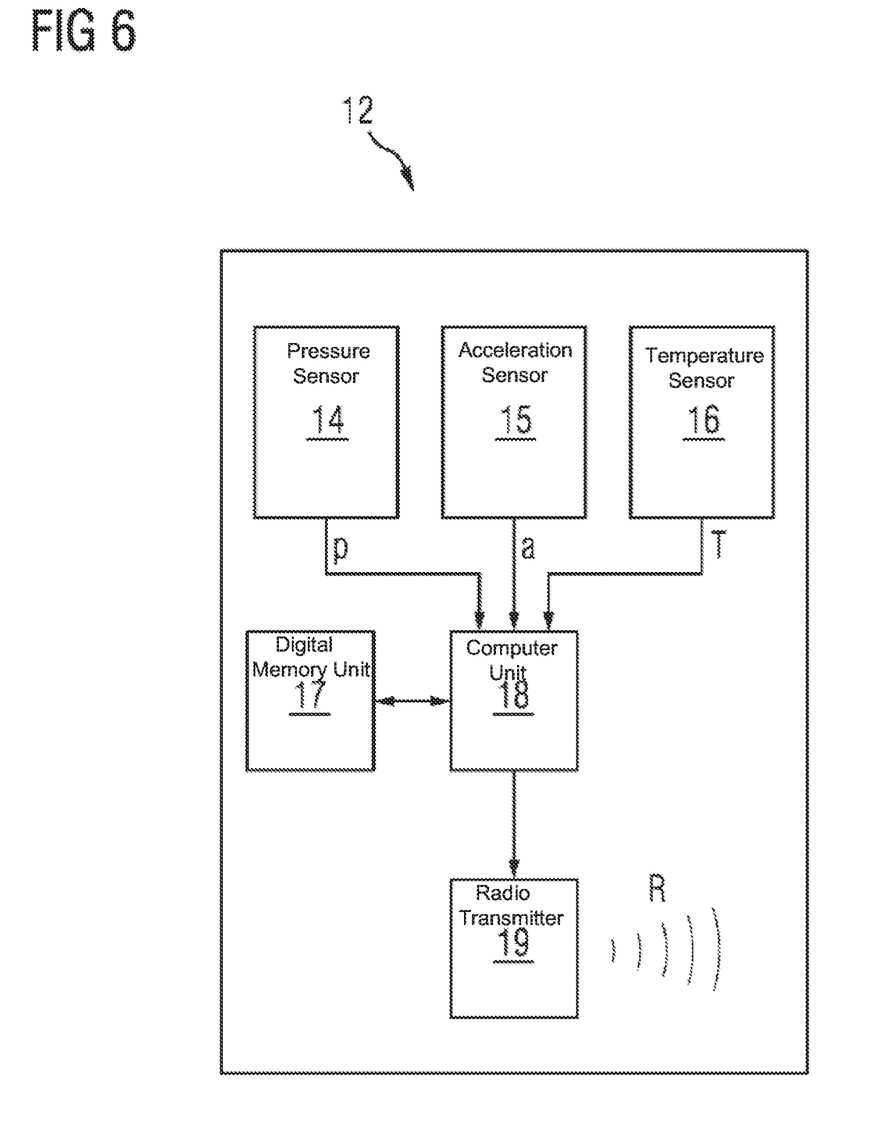
FIG. 6 shows a block diagram of an electronic wheel unit used in the system of the vehicle of FIG. 2.

With reference to FIG. 6, which shows the design of such an electronic wheel unit 12 (cf. electronic wheel units 12-1 to 12-4 in FIG. 2) by way of example, each of the wheel units 12 comprises a pressure sensor 14 for measuring the tire pressure p and for providing a sensor signal representing the tire pressure p, an acceleration sensor 15 for measuring a radial acceleration a at the mounting site of the electronic wheel unit 12 and for providing a sensor signal representing this radial acceleration a, and a temperature sensor 16 for measuring a tire temperature T in the interior of the tire 2 and for providing a sensor signal representing this tire temperature T.

Said sensor signals are fed for processing to a program-controlled computer unit 18, the operation of which is controlled by a program code stored in an associated digital memory unit 17.

The computer unit 18 generates the wheel operating data to be transmitted, which data is sent to the vehicle-side control device 20 in the form of the radio signals R.

The vehicle-side control device 20 is connected for this purpose to a radio receiver 30 for receiving the radio signals R from all of the electronic wheel units 12.

In the illustrated example, the measurement of the radial acceleration a and provision of the corresponding sensor signal is used to determine, by way of evaluating the sensor signal characteristic, values of an instantaneous rotational speed and/or rotational position of the wheel W in question and to incorporate corresponding information about this into the wheel operating data (radio signals R).

The radio receiver 30 decodes the received data telegrams and forwards the information contained therein to a reception device 21 of the control device 20.

In the exemplary embodiment shown, the vehicle 1 is further equipped with a satellite-assisted position determination unit in the form of a GPS device 8 which is designed to determine position data relating to the current position of the vehicle 1 by way of receiving and evaluating radio signals from a plurality of satellites S. The GPS device 8 can constitute a component of a navigation system that is often provided in modern vehicles in any case and transmits the determined position data and/or a speed v of the vehicle 1 determined therefrom to the reception device 21 of the control device 20.

The vehicle 1 is further equipped with a vehicle acceleration sensor 9 which is arranged fixed to the vehicle and is designed to determine an instantaneous acceleration $A_{veh}$ of the vehicle 1 and to output corresponding data to the reception device 21 of the control device 20.

The vehicle 1 is further equipped with rotational speed sensors 10-1 to 10-4 which are each arranged fixed to the vehicle and designed to determine values of the instantaneous rotational speed and/or rotational position of the vehicle wheel in question from amongst the vehicle wheels W1-W4 and to output said values to the reception device 21 of the control device 20 in the form of rotational speed sensor data D1, D2, D3 or D4.

The control device 20 further has a program-controlled computer unit 22 and an associated memory unit 28, wherein, in particular, a program code used to operate the computer unit 22 can be stored in the memory unit 28.

The computer unit 22 of the control device 20 in connection with said program code in the memory unit 28 at the same time implements the determination devices 23, 24 and 25 symbolically indicated in FIG. 2 and described below with regard to their function.

The manner of operation of the control device 20 for the vehicle 1 in order to determine the tread depth td of the tread 4 of a tire 2 can be described as follows:

The reception device 21 receives the instantaneous rotational speed, for example the angular speed co, of the wheel W having the tire 2 in question, the instantaneous speed v of the vehicle 1 and at least one operating parameter of the tire, selected from the group consisting of the instantaneous tire temperature T, the instantaneous tire pressure p and the instantaneous tire load RL.

In the illustrated example, the rotational speed is determined based on the rotational speed sensor data D of the rotational speed sensor in question from amongst the rotational speed sensors 10-1 to 10-4. As an alternative or in addition, the radio signal R in question could also be used for this purpose.

The instantaneous speed v of the vehicle 1 is determined based on that data which is determined by the GPS device 8.

In the illustrated example, the electronic wheel unit 12 in question, which here delivers data relating to the instantaneous tire temperature T and relating to the instantaneous tire pressure p in particular, is used to determine the at least one first operating parameter of the tire 2. This data can also contain for example, information about the instantaneous tire load RL, which may be achieved in the illustrated example, for example, by way of the instantaneous length L of the tire footprint first being determined, for example, by suitable evaluation of the sensor signal provided by the acceleration sensor 15 in order to determine the tire load RL therefrom taking into consideration further parameters, for example the tire temperature T and/or the tire pressure p in particular.

In a departure from this exemplary embodiment, instead of the acceleration sensor 15, a deformation sensor could also be used, for example, in order to accordingly determine the described parameters L and RL by evaluating the sensor signal profile of the deformation sensor.

The reception device 21 further receives all three of the further first operating parameters of the tire 2 used in this example, that is to say the instantaneous roadway gradient SL, the instantaneous vehicle drive mode DT and the instantaneous tire material expansion BE.

In the illustrated example, the instantaneous roadway gradient SL is calculated based on the vehicle acceleration $A_{veh}$ measured by means of the vehicle acceleration sensor 9 of the vehicle 1 and a vehicle longitudinal acceleration determined by evaluating the rotational speeds of the wheels W1-W4, wherein the rotational speeds from the rotational speed sensor data D1-D4 are used (here the rotational angular speeds ω).

Figure 7:
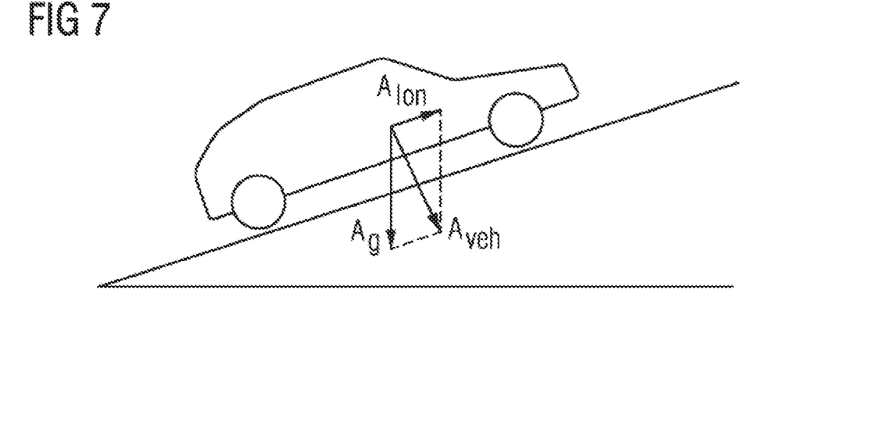
FIG. 7 shows an illustration showing tire operation on a vehicle on a roadway with a roadway gradient which is different from zero.

FIG. 7 illustrates, by way of example, a situation in which the vehicle 1 is traveling uphill, wherein SL represents the angle of inclination as viewed in the direction of travel which is to be determined by said vehicle from the above-mentioned vehicle accelerations. The acceleration sensor 9 measures the effective vehicle acceleration $A_{veh}$ which is given as the vectorial sum of the vehicle longitudinal acceleration $A_{lon}$ and acceleration due to gravity $A_g$. In contrast, the vehicle acceleration determined using the rotational speed sensor data D1-D4 is equal to the vehicle longitudinal acceleration $A_{lon}$, and therefore the angle of inclination SL can be calculated on the basis of a vectorial comparison of $A_{veh}$ and $A_{lon}$.

The vehicle drive mode DT is transmitted to the reception device 21 from another part (not illustrated) of the vehicle electronics system of the vehicle 1.

Figure 8:
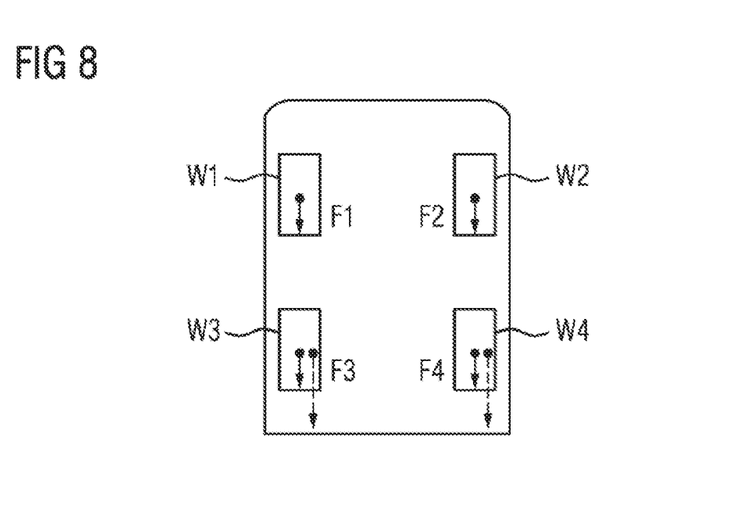
FIG. 8 shows an illustration showing various vehicle drive modes in a vehicle.

FIG. 8 shows, by way of example, two different vehicle drive modes on the basis of the drive forces F1-F4 exerted on the roadway by the wheels W1-W4 in each mode. In FIG. 8, the forces F1-F4 are illustrated using solid lines for an all-wheel drive mode, whereas drive forces F3 and F4 for a rear-wheel drive mode are indicated using dashed lines.

If a changeover is made, for example, from the rear-wheel drive mode to the all-wheel drive mode during driving, this leads to the slip increasing, for example, at the wheel W1. However, the influence on the result of the tread depth determination actually caused in this way is corrected or at least partially compensated for by taking into consideration DT when determining $r2_{dyn}$.

The tire material expansion BE is determined in the control device 20 using the computer unit 22 on the basis of a model function, wherein the model function or functional parameters determining this model function can be stored, for example, in the memory unit 28 and optionally periodically updated.

Figure 9:
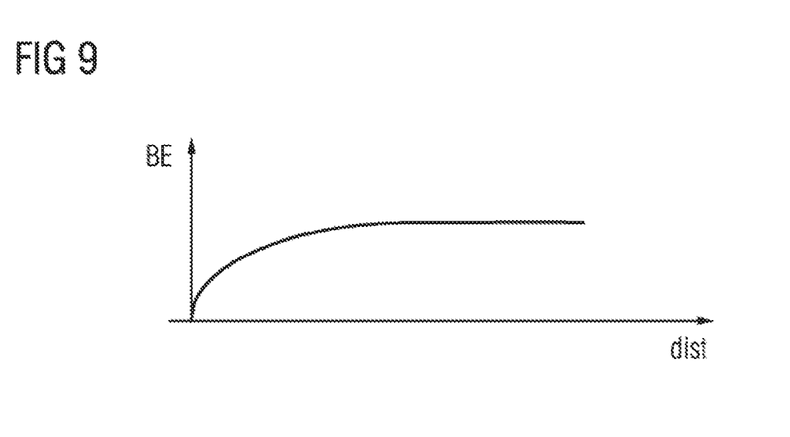
FIG. 9 shows an exemplary graph of an additional contribution, caused by tire material expansion, to the dynamic inside radius of a tire depending on a mileage of the tire.

FIG. 9 shows, by way of example, a typical profile of the instantaneous tire material expansion BE depending on the mileage dist of the tire in question. During normal operation, there is typically initially a linear increase in BE as the mileage dist increases, wherein the increase in BE generally decreases and is very small toward the end of the service life of the tire. With such a convex model function as shown in FIG. 9 by way of example, the instantaneous tire material expansion BE can be determined from a tire age in question which is defined as the mileage dist here. This tire material expansion BE is then used as an additional contribution $r2_{dyn,BE}$ due to the tire material expansion when determining the dynamic inside radius $r2_{dyn}$ of the tire in question.

The first determination device 23, which is formed by a first partial functionality of the control program running in the computer unit 22 in the exemplary embodiment shown, determines an instantaneous dynamic wheel radius $r1_{dyn}$ of the wheel W having the tire 2 in question based on the received instantaneous rotational speed (here: angular speed ω) and the received instantaneous speed v of the vehicle 1. This is performed in accordance with the relationship $r1_{dyn}=v/\omega$.

The second determination device 24, which is formed by a second partial functionality of the control program in the exemplary embodiment shown, determines the instantaneous dynamic inside radius $r2_{dyn}$ of the wheel W based on the at least one received first operating parameter (here, in particular, for example the tire temperature T, the tire pressure p and the tire load RL) and further based on the further (first) operating parameters roadway gradient SL, vehicle drive mode DT and tire material expansion BE.

The dynamic inside radius $r2_{dyn}$ can be determined, for example, by way of determining the dynamic inside radius $r2_{dyn}$ beforehand as the difference between the dynamic wheel radius $r1_{dyn}$ and the defined tread depth $td_0$ (for example $td_{new}$) in the case of a tire having a defined tread depth $td_0$, for example a new tire with a new tread depth $td_{new}$ ($r2_{dyn}=r1_{dyn}-td_0$), and then storing this inside radius $r2_{dyn}$ determined thereby, for example, at the beginning of the tire life, for example, for the entire remainder of the tire life as a base value in the control device 20 or its memory unit 28 and, when the method is carried out, further correcting said inside radius by way of the second determination device 24 based on the at least one first operating parameter and the further (first) operating parameters in order to determine the instantaneous dynamic inside radius $r2_{dyn}$.

The third determination device 25, which is formed by a third partial functionality of the control program in the exemplary embodiment shown, determines the tread depth td of the tread 4 of the tire 2 based at least on the determined values $r1_{dyn}$ and $r2_{dyn}$.

One particular feature of the determination device 25 or of the tread depth determination is that in this case a correction variable F determined beforehand for the type of tire 2 in question is taken into consideration, which correction variable characterizes the relationship between a change Δtd in the tread depth td, on the one hand, and a change Δ ($r1_{dyn}-r2_{dyn}$) resulting therefrom in the difference between the dynamic wheel radius $r1_{dyn}$ and the dynamic inside radius $r2_{dyn}$, on the other hand.

In the illustrated example, this correction variable F, which is described in even more detail below, is stored in the memory unit 28 of the control device 20 and was determined beforehand by measuring the type of tire in question on a tire test bench.

With regard to the correction variable F, two limit cases of a mathematical-physical model of a tire 2 installed, for example, on the vehicle 1 of FIG. 2 are explained below with reference to FIG. 4 and FIG. 5.

Although this mathematical-physical model may explain the significance and the advantage of the process according to the invention of taking into consideration the correction variable F, the model should in no way be understood as restricting the present invention, but rather merely to be an illustrative explanatory approach for the advantage achieved by way of the invention.

Figure 4:
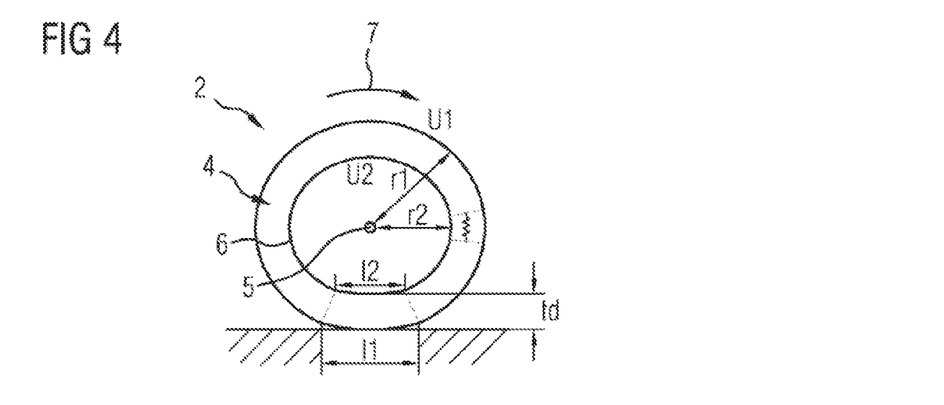
FIG. 4 shows a schematic side view of a tire of the wheel of FIG. 3 for explaining geometrical relationships according to a tire model in a first limit case.
Figure 5:
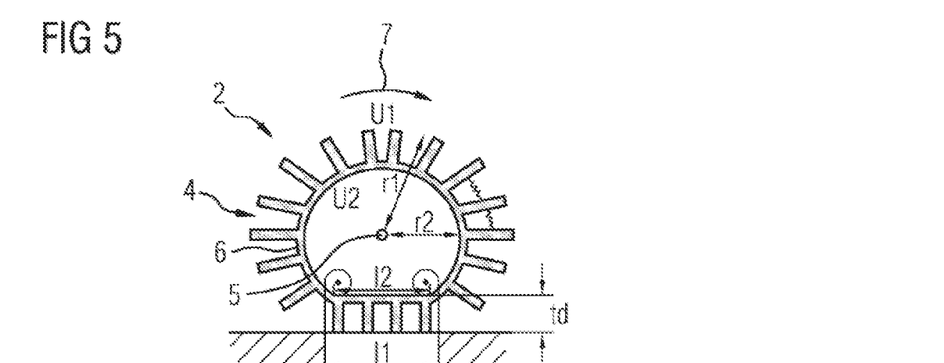
FIG. 5 shows a schematic side view of the tire of the wheel of FIG. 3 for explaining geometrical relationships according to the tire model in a second limit case.

FIG. 4 and FIG. 5, in a schematic side view corresponding to FIG. 3, once again each show, in isolation, the tire 2 in an operating situation, that is to say rolling on a driving surface and in this case loaded by a wheel load RL acting from above. The tread 4 or its tread depth td is illustrated with an exaggerated size in FIGS. 4 and 5 for the sake of clarity.

In addition to a geometric wheel radius r1 and a geometric inside radius r2, which can be measured on the unloaded tire 2 for example, an outer circumference U1 at the outer tread end and an inner circumference U2 at the tread start 6 of the tire 2 are also indicated.

FIG. 4 shows a case in which the tire 2 has only slight deformation in the region of its contact with the driving surface and therefore a small tire footprint. In this case, the cross section of the tire 2 can accordingly be considered to be approximately a circular object, in which circumferential sections 11 on the outer circumference U1 and 12 on the inner circumference U1 situated in the contact region between the tire 2 and the driving surface, as illustrated, have different lengths (11>12).

In contrast, FIG. 5 shows a case in which, depending on the type of tire, the tire 2 is deformed on the bottom side in the contact region between the tire 2 and the driving surface to such an extent that the rolling of the tread 4 exhibits a similarity to the rolling of the track of a tracked chassis or of a tracked vehicle (for example a tank, a bulldozer, a snowmobile etc.).

Using this tank track analogy, FIG. 5 indicates two conceptual tracked chassis rollers over which the tread 4 of the tire 2 runs like a track of a tracked chassis provided with these rollers.

In this case, the circumferential sections 11 on the outer circumference U1 and 12 on the inner circumference U2 situated in the contact region between the tire 2 and the driving surface are of substantially the same length. This description or this limit case is also referred to below as tank track limit case.

It is pointed out at this juncture that, in particular depending on the type of tire 2 and on specific operating parameters of the operation of the tire 2 and of the vehicle 1, cases that lie as it were between these two limit cases according to FIG. 4 and FIG. 5 can be imagined and are even particularly relevant in practice.

With regard to the dynamic radii, a difference $\Delta r_{dyn}$ with respect to measurements on the outer circumference U1 and inner circumference U2 may be defined as $\Delta r_{dyn}=11-12$.

However, to determine the tread depth td or a change Δtd in the tread depth td from which the tread depth td can be easily determined, the geometric radii of the tire 2 or a corresponding difference $\Delta r_{geom}$ is critical: $\Delta td=\Delta r_{geom}$, where $\Delta r_{geom}=r1-r2$, and where r1 denotes the geometric wheel radius and r2 denotes the geometric inside radius of the wheel 2.

However, in the tread depth determination according to the invention (cf. step S6 in FIG. 1), the dynamic difference $\Delta r_{dyn}$ which can be obtained from the determined values of $r1_{dyn}$ and $r2_{dyn}$ can advantageously be mapped onto the ultimately critical difference $\Delta r_{geom}$ (=Δtd).

In the limit case of FIG. 4, a change in a geometric radius is linked directly to a change of identical magnitude in the corresponding dynamic radius, giving: $\Delta r_{dyn}=\Delta r_{geom}$.

However, in the limit case of FIG. 5 (tank track limit case), a change $\Delta r_{geom}$ or equivalently a tread depth change Δtd does not result in any corresponding change $\Delta r_{dyn}$ in the dynamic radius. It holds true that $\Delta r_{dyn}=0$.

This can be clearly seen in FIG. 5: In the tank track limit case, a change Δtd in the tread depth td does not bring about a change in the relationship between the rotational speed (for example angular speed co) of the tire 2 and the speed v of the vehicle 1. Rather, the value of the tread depth td in this case influences only the vertical distance between the wheel center 5 and the driving surface, but not said relationship.

Based on the above observations, for example according to one particularly simple embodiment, a linear relationship or linear mapping between a dynamic radius or a change in a dynamic radius and the associated geometric radius or the change in the associated geometric radius can be assumed, which linear relationship can be expressed, with reference to corresponding differences, by the following relationship:

$$\Delta r_{geom}=F \cdot \Delta r_{dyn}$$

where F represents a correction constant characteristic of at least the type of tire 2 and which represents the relationship between the difference or change Δtd in the tread depth td, on the one hand, and the corresponding difference or change $\Delta(r1_{dyn}-r2_{dyn})$ resulting therefrom, on the other hand.

In this embodiment, for the case according to FIG. 4, it accordingly holds true that F=1, whereas, for the case according to FIG. 5 (tank track limit case), the correction constant F diverges (F=∞).

In this limit case (FIG. 5), a determination (calculation) of the geometric tread depth change Δtd fails in theory due to a determined change $\Delta(r1_{dyn}-r2_{dyn})$ in the dynamic radius difference $r1_{dyn}-r2_{dyn}$ alone.

In practice, however, it is advantageous, for common tires 2, for the behavior to lie rather between the described limit cases according to FIG. 4 and FIG. 5, such that the limit case F=∞ does not occur in the mentioned linear mapping. In this respect, it is feasible, in the linear mapping, to provide a correction constant F which is finite but which may be considerably greater than 1. In one embodiment, the correction constant is selected so as to lie in the range of from 2 to 4.

Independently of this, in practice, in the tread depth determination according to the invention based on the determined instantaneous dynamic wheel radius $r1_{dyn}$ and the determined instantaneous dynamic inside radius $r2_{dyn}$, provision can be made for the tread depth td to be determined, in the case of which td is not determined exclusively depending on the difference $r1_{dyn}-r2_{dyn}$, but rather one or more further variables of the type already described, in particular operating parameters of the tire 2 in question and/or of the vehicle 1 in question, are taken into consideration or jointly taken into consideration.

Therefore, provision can be made, for example, for the tread depth td to be determined, as an alternative or in addition to said dependency on the difference $r1_{dyn}-r2_{dyn}$, depending on the dynamic wheel radius $r1_{dyn}$ and/or the dynamic inside radius $r2_{dyn}$.

As an alternative or in addition, further variables such as, in particular, for example operating parameters of the vehicle operation, for example the speed v of the vehicle 1, and/or operating parameters of the tire operation, for example tire temperature T, tire pressure p and/or tire load RL, may be provided as variables, on which the result of the tread depth determination (step S6 in FIG. 1) depends.

As an alternative to using a correction constant, a correction function F1, characteristic at least of the type of tire 2, for mapping the difference $r1_{dyn}-r2_{dyn}$ onto a tread depth change Δtd can also be used as the correction variable F.

In this embodiment, for example a change $\Delta r_{geom}$ in the geometric radius and accordingly a geometric change Δtd in the tread depth td can be calculated as a value of the function F1 which depends at least on the change $\Delta r_{dyn}$ in the dynamic radius: $\Delta r_{geom}=F1(\Delta r_{dyn})$.

Such a mapping function F1 can be stored, for example, by means of one or more characteristic curves in a memory device of the system used for carrying out the method according to the invention, for example in the form of a lookup table.

LIST OF REFERENCE SIGNS

1 Vehicle
v Speed of the vehicle
W1 to W4 Wheels of the vehicle
ω Angular speed of the wheel
2 Tire
RL Tire load
3 Rim
L Length of the tire footprint
4 Tread of the tire
td Tread depth
5 Wheel center
6 Start of the tread
7 Wheel rotation
S Satellites
8 GPS device
9 Vehicle acceleration sensor
$A_{veh}$ Vehicle acceleration
$A_g$ Acceleration due to gravity
$A_{lon}$ Vehicle longitudinal acceleration
10-1 to 10-4 Rotational speed sensors
D1 to D4 Rotational speed sensor data
12-1 to 12-4 Electronic wheel units
R1 to R4 Radio signals
14 Pressure sensor
p Pressure
15 Acceleration sensor
a Radial acceleration
16 Temperature sensor
T Tire temperature
17 Memory unit
18 Computer unit
19 Radio transmitter
20 Control device
21 Reception device
22 Computer unit
23 First determination device
24 Second determination device
25 Third determination device
28 Memory unit
30 Radio receiver
U1 Outer circumference
11 Circumferential section (on outer circumference)
r1 Geometric wheel radius
$r1_{dyn}$ Dynamic wheel radius
U2 Inner circumference
12 Circumferential section (on inner circumference)
r2 Geometric inside radius
$r2_{dyn}$ Dynamic inside radius
SL Instantaneous roadway gradient
$C_{SL}$ Coefficient
$r2_{dyn,SL}$ Additional contribution based on roadway gradient
DT Instantaneous vehicle drive mode
Tq (Additional) drive torque of the wheel
F1 to F4 Drive forces
$C_{Tq}$ Coefficient
$r2_{dyn,DT}$ Additional contribution based on vehicle drive mode
BE Instantaneous tire material expansion
dist Mileage of the tire (in kilometers)
$r2_{dyn,BE}$ Additional contribution based on tire material expansion

The invention claimed is:

1. A method for determining a tread depth of a tread of a tire during operation of a vehicle having the tire, the method comprising the following steps:
   determining an instantaneous rotational speed of a wheel having the tire on the vehicle based on data determined by at least one first sensor;
   determining an instantaneous speed of the vehicle based on data determined by at least one second sensor being different than the at least one first sensor;
   determining an instantaneous dynamic wheel radius of the wheel having the tire based on the determined instantaneous rotational speed and the determined instantaneous speed of the vehicle;
   determining at least one first operating parameter of the tire selected from the group consisting of an instantaneous tire temperature, an instantaneous tire pressure and an instantaneous tire load;
   determining an instantaneous dynamic inside radius of the wheel based on the at least one determined first operating parameter, and determining the inside radius of the wheel as a distance between a wheel center and a tire-side start of the tread;

determining a tread depth of the tread of the tire based on the determined instantaneous dynamic wheel radius and the determined instantaneous dynamic inside radius;

determining at least one further first operating parameter of the tire selected from the group consisting of an instantaneous roadway gradient, an instantaneous vehicle drive mode and an instantaneous tire material expansion; and further determining the instantaneous dynamic inside radius based on the at least one determined further first operating parameter.

2. The method according to claim 1, which further comprises:

determining the instantaneous roadway gradient as the at least one further first operating parameter; and rejecting results of at least one of the instantaneously carried out determination or steps of the method based on the instantaneously carried out determination as invalid, upon the determined roadway gradient exceeding a predetermined roadway gradient threshold value.

3. The method according to claim 1, which further comprises determining the instantaneous roadway gradient as the at least one further first operating parameter, and carrying out a correction being linearly dependent on the determined instantaneous roadway gradient when determining the instantaneous dynamic inside radius.

4. The method according to claim 1, which further comprises determining the instantaneous roadway gradient based on a vehicle acceleration measured by using an acceleration sensor of the vehicle and on a vehicle longitudinal acceleration determined by evaluating at least one rotational speed of a wheel of the vehicle.

5. The method according to claim 1, which further comprises determining the instantaneous vehicle drive mode as the at least one further first operating parameter, and carrying out a correction being linearly dependent on a drive torque determined in dependence on the determined instantaneous vehicle drive mode when determining the instantaneous dynamic inside radius.

6. The method according to claim 1, which further comprises determining the instantaneous vehicle drive mode as the at least one further first operating parameter, and carrying out a correction implemented by using a lookup table depending on the determined instantaneous vehicle drive mode and the determined instantaneous speed of the vehicle when determining the instantaneous dynamic inside radius.

7. The method according to claim 1, which further comprises determining the instantaneous tire material expansion based on a tire age of the tire as the at least one further first operating parameter, and carrying out a correction depending on the determined instantaneous tire material expansion when determining the instantaneous dynamic inside radius.

8. The method according to claim 7, which further comprises determining the instantaneous tire material expansion based on a predetermined model function for mapping the instantaneous tire age of the tire onto the instantaneous tire material expansion, and providing the model function as a concave function.

9. The method according to claim 8, which further comprises predetermining the model function depending on tire information data about the tire.

10. The method according to claim 7, which further comprises:

determining the tread depth based on the instantaneous tire age of the tire in a first phase immediately after installation of a new tire;

learning an influence of the speed of the vehicle on the instantaneous dynamic wheel radius in a second phase; and determining the tread depth based on the determined instantaneous dynamic wheel radius and the determined instantaneous dynamic inside radius in a third phase following the second phase.

11. The method according to claim 10, which further comprises further determining the model function in the second phase by evaluating variables determined in the first phase and the second phase.

12. The method according to claim 1, which further comprises:

determining the tread depth by taking into consideration a correction variable determined in advance for the type of tire; and using the correction variable to characterize a relationship between a change in the tread depth and a change resulting from the change in the tread depth in a difference between the dynamic wheel radius and the dynamic inside radius.

13. The method according to claim 12, which further comprises using a correction constant characteristic of the type of tire as the correction variable, and using the correction constant to represent a relationship between the change in the tread depth and the change resulting from the change in the tread depth in the difference between the dynamic wheel radius and the dynamic inside radius.

14. The method according to claim 12, which further comprises using a correction function being characteristic of the type of tire for mapping a difference between the dynamic wheel radius and the dynamic inside radius onto a change in the tread depth as the correction variable.

15. The method according to claim 1, which further comprises:

additionally determining at least one second operating parameter selected from the group consisting of an instantaneous acceleration of the vehicle, an instantaneous yaw rate of the vehicle, an instantaneous steering angle, an instantaneous torque of a drive motor of the vehicle and an operating state of a braking device of the vehicle; and additionally determining the tread depth in dependence on the at least one determined second operating parameter.

16. A control device for a vehicle for determining a tread depth of a tread of a tire of the vehicle, the control device comprising:

a reception device configured to receive an instantaneous rotational speed of a wheel of the vehicle having the tire, an instantaneous speed of the vehicle and at least one first operating parameter of the tire selected from the group consisting of an instantaneous tire temperature, an instantaneous tire pressure and an instantaneous tire load;

a first determination device configured to determine an instantaneous dynamic wheel radius of the wheel having the tire based on the received instantaneous rotational speed and the received instantaneous speed of the vehicle;

a second determination device configured to determine an instantaneous dynamic inside radius of the wheel based on the at least one received first operating parameter, the inside radius of the wheel being a distance between a wheel center and a tire-side start of the tread;

a third determination device configured to determine a tread depth of the tread of the tire based on the determined instantaneous dynamic wheel radius and the determined instantaneous dynamic inside radius;

said reception device being further configured to receive at least one further first operating parameter of the tire selected from the group consisting of an instantaneous roadway gradient, an instantaneous vehicle drive mode and an instantaneous tire material expansion; and said second determination device being further configured to determine the instantaneous dynamic inside radius additionally based on the at least one determined further first operating parameter.

17. A system for a vehicle for determining a tread depth of a tread of a tire of the vehicle, the system comprising:

a control device according to claim 16; and at least one electronic wheel unit configured to be disposed in the tire, said at least one electronic wheel unit having at least one sensor selected from the group consisting of a temperature sensor, a pressure sensor, an acceleration sensor and a deformation sensor.

* * * * *